(12) United States Patent
Lopez et al.

(10) Patent No.: US 10,513,913 B2
(45) Date of Patent: Dec. 24, 2019

(54) CONTROLLING HIGH-PRESSURE PRODUCTION TRAP SEPARATION EFFICIENCY

(71) Applicant: Saudi Arabian Oil Company, Dhahran (SA)

(72) Inventors: Miguel Lopez, Abqaiq (SA); Ramsey White, Abqaiq (SA); Pradeepkumar Krishnanivas Krishnankutty, Abqaiq (SA); Rohit Patwardhan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 387 days.

(21) Appl. No.: 15/630,083

(22) Filed: Jun. 22, 2017

(65) Prior Publication Data

US 2018/0371876 A1    Dec. 27, 2018

(51) Int. Cl.
*B01D 53/22*      (2006.01)
*E21B 43/01*      (2006.01)
(Continued)

(52) U.S. Cl.
CPC .......... *E21B 43/01* (2013.01); *B01D 19/0068* (2013.01); *E21B 43/36* (2013.01); *B01D 19/00* (2013.01); *E21B 43/00* (2013.01)

(58) Field of Classification Search
CPC .. B01D 19/0068; B01D 17/12; B01D 17/047; B01D 19/00; E21B 43/00; E21B 43/01; E21B 43/36; C10G 33/08
See application file for complete search history.

(56) References Cited

U.S. PATENT DOCUMENTS 4,581,134 A    4/1986  Richter, Jr. et al.
4,977,915 A   12/1990  Marrelli
(Continued)

FOREIGN PATENT DOCUMENTS

WO    2017023858    2/2017
WO    2018129228    7/2018

OTHER PUBLICATIONS

International Search Report and Written Opinion issued in International Application No. PCT/US2018/037278 dated Sep. 5, 2018, 14 pages.

(Continued)

*Primary Examiner* — Anthony R Shumate
(74) *Attorney, Agent, or Firm* — Fish & Richardson P.C.

(57) ABSTRACT

A computer-implemented method can include implementing a feedback control scheme including controlling a separation efficiency for a high-pressure production trap (HPPT) by manipulating the demulsifier concentration. Controlling the separation efficiency can include determining, as a function of temperature and based on correlations of historical process data, minimum and maximum target separation efficiencies; identifying a target separation efficiency that is between the minimum and maximum target separation efficiencies; and adjusting a demulsifier dosage, used in calculating the separation efficiency, between a minimum demulsifier concentration and a maximum demulsifier concentration. The adjusting can include: when the separation efficiency is below the target separation efficiency, adjusting, using a PID controller, the demulsifier dosage upward but not to exceed a maximum dosage concentration; and when the separation efficiency is above the target separation efficiency, adjusting, using the PID controller, the demulsifier dosage downward above a minimum dosage concentration.

20 Claims, 9 Drawing Sheets

(51) Int. Cl.
  *B01D 19/00* (2006.01)
  *E21B 43/36* (2006.01)
  *E21B 43/00* (2006.01)

(56) References Cited

U.S. PATENT DOCUMENTS

| | | | |
|---|---|---|---|
| 5,129,468 A * | 7/1992 | Parmenter | E21B 21/063 |
| | | | 175/66 |
| 5,353,237 A | 10/1994 | Bass et al. | |
| 6,535,795 B1 | 3/2003 | Schroeder et al. | |
| 7,318,476 B2 | 1/2008 | Ayers | |
| 7,373,276 B2 | 5/2008 | Bettge | |
| 7,721,806 B2 | 5/2010 | Ayers | |
| 9,120,983 B2 | 9/2015 | Wickes et al. | |
| 9,157,035 B1 | 10/2015 | Ball, IV et al. | |
| 2010/0312401 A1 | 12/2010 | Gutierrez et al. | |
| 2013/0024026 A1* | 1/2013 | Prasad | B01D 17/04 |
| | | | 700/272 |
| 2013/0026082 A1 | 1/2013 | Al-Shafei et al. | |
| 2013/0140216 A1 | 6/2013 | Wickes et al. | |
| 2014/0026085 A1 | 1/2014 | Amminudin et al. | |
| 2014/0066668 A1* | 3/2014 | Lorenz, II | C07C 29/76 |
| | | | 568/913 |
| 2014/0202929 A1 | 7/2014 | Mason et al. | |
| 2015/0361350 A1* | 12/2015 | Prasad | G05D 7/0676 |
| | | | 700/285 |
| 2016/0052799 A1* | 2/2016 | Grave | B01D 17/0214 |
| | | | 210/634 |
| 2018/0195010 A1* | 7/2018 | Salu | C10G 33/04 |
| 2019/0010796 A1* | 1/2019 | De Freitas | B01D 17/0214 |
| 2019/0062645 A1* | 2/2019 | Al Seraihi | C10G 31/08 |
| 2019/0202986 A1* | 7/2019 | Alfonso Alegre | B29B 7/007 |
| 2019/0205213 A1* | 7/2019 | Kershaw | B60R 16/023 |
| 2019/0229960 A1* | 7/2019 | Lopez | H04B 1/0053 |
| 2019/0232959 A1* | 8/2019 | Kershaw | B60W 10/08 |
| 2019/0240596 A1* | 8/2019 | Less | B01D 17/045 |

OTHER PUBLICATIONS

Alshehri, Ali Khairan; "Modeling and Optimization of Desalting Process in Oil Industry", Thesis presented to the University of Waterloo, ON Canada, 2009.
Cruide Oil Desalting Process, Intech 2015; http://dx/doi.org/10.5772/61274; Research Gate; Chapter 4, 19 pages.

* cited by examiner

Implement a feedback control scheme including controlling a separation efficiency for a high-pressure production trap (HPPT) by manipulating the demulsifier concentration 402

Determine, as a function of temperature and based on correlations of historical process data, a minimum target separation efficiency and a maximum target separation efficiency 404

Identify a target separation efficiency that is between the minimum target separation efficiency and the maximum target separation efficiency 406

Adjust a demulsifier dosage, used in calculating the separation efficiency, between a minimum demulsifier concentration and a maximum demulsifier concentration 408

Separation efficiency below or above the target separation efficiency 410

Below → When the separation efficiency is below the target separation efficiency, adjust (using a PID controller) the demulsifier dosage upward but not to exceed a maximum dosage concentration 412

Above → When the separation efficiency is above the target separation efficiency, adjust (using the PID controller) the demulsifier dosage downward above a minimum dosage concentration 414

CONTROLLING HIGH-PRESSURE PRODUCTION TRAP SEPARATION EFFICIENCY

BACKGROUND

Oil companies operate processes and pipelines that can include, in addition to oil, produced water that is in an emulsion form. Demulsifier chemicals can be added to oil-water emulsions in upstream pipelines or in a crude desalting process in order to enhance separation of water from oil.

SUMMARY

The present disclosure describes methods and systems, including computer-implemented methods, computer program products, and computer systems for controlling demulsifier injection in response to process changes such as crude temperature, oil well line-up, and feed rates. For example, a high-pressure production trap (HPPT) separation efficiency set point, which is a percentage of water separated in HPPT versus total produced water, can be adjusted by increasing and decreasing a demulsifier dosage within predefined limits.

In an implementation, a computer-implemented method can include implementing a feedback control scheme including controlling a separation efficiency for a high-pressure production trap (HPPT) by manipulating the demulsifier concentration. Controlling the separation efficiency can include determining, as a function of temperature and based on correlations of historical process data, a minimum target separation efficiency and a maximum target separation efficiency; identifying a target separation efficiency that is between the minimum target separation efficiency and the maximum target separation efficiency; and adjusting a demulsifier dosage, used in calculating the separation efficiency, between a minimum demulsifier concentration and a maximum demulsifier concentration. The adjusting can include: when the separation efficiency is below the target separation efficiency, adjusting, using a PID controller, the demulsifier dosage upward but not to exceed a maximum dosage concentration; and when the separation efficiency is above the target separation efficiency, adjusting, using the PID controller, the demulsifier dosage downward above a minimum dosage concentration.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the proposed techniques can improve on or eliminate manual control of HPPT separation performance in which operators are left to determine the demulsifier dosage manually, which can lead to overdosing or under-dosing. Second, techniques can resolve unstable dehydrator flow that include large swings in dehydrator water flow due to an uncontrolled percentage of water separated in the HPPT. For example, the instability can impact water oil separator level control and salt water injection pump efficiency. Third, techniques can improve systems that are prone to overdosing of demulsifier, such as injecting more demulsifier than is needed and that leads to higher operating expenditures. Fourth, techniques can improve systems that are prone to under-dosing of demulsifier, such as injecting less demulsifier than needed, which can lead to process upsets. Fifth, techniques can replace schemes that use rule based logic and that are not true feedback schemes. Sixth, techniques can replace systems that do not control separation performance of the HPPT because, for example, the systems do not incorporate maximum or minimum limits for demulsifier to prevent the system from overdosing or under-dosing. Seventh, the techniques can be simple and transparent for engineering to tune and adjust as necessary, requiring minimal operator input. For example, the system can be easily enhanced by adding additional control blocks, such as for control of product BS&W, salt-in-crude, or for other reasons. Eighth, the process can be marketed as a solution to operators of gas-oil separation processes that require enhanced demulsifier injection control for separation of emulsions from oil or hydrocarbons. Ninth, the scheme allows for the addition of as many inputs, such as dehydrator emulsion profile, desalter emulsion profile, and other inputs, to override the required demulsifier concentration set point. Tenth, the scheme allows for the incorporation of more controller outputs, such as the demulsifier concentration set point for additional demulsifier injection points at other locations of the process. Eleventh, the scheme is adjustable to allow for control of HPPT separation efficiency in a GOSP with more than one increment. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4 is a flowchart illustrating an example method for controlling high-pressure production trap (HPPT) separation efficiency, according to an implementation.

Like reference numbers and designations in the various drawings indicate like elements.

DETAILED DESCRIPTION

Figure 1:
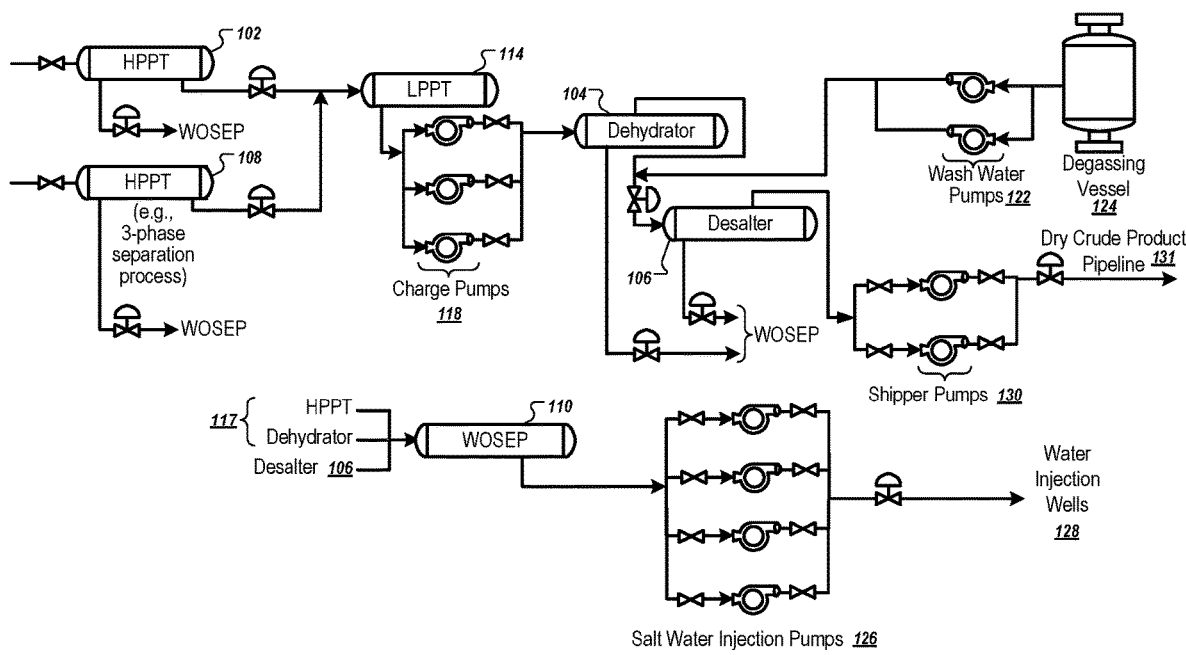
FIG. 1 is a schematic of an example generic wet crude handling configuration, according to an implementation.

The following detailed description describes adjusting demulsifier injection rates to control high-pressure production trap (HPPT) separation efficiency, and is presented to enable any person skilled in the art to make and use the disclosed subject matter in the context of one or more particular implementations. Described is an overall design of a smart demulsifier control (SDC) scheme and proposed use of reconciled values for estimating HPPT efficiency, a modeling and tuning strategy of various control blocks, and a determination of individual tuning parameters. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

The SDC scheme can implement a feedback control that focuses on controlling the reconciled HPPT separation efficiency by manipulating the demulsifier concentration or in other ways. The following are the features of the SDC scheme. Empirical models based on historical process data can be used to determine the minimum achievable separation efficiency as a function of temperature. An operator has the flexibility to increase the expected separation performance by a certain margin. To meet a target separation efficiency, the demulsifier dosage can be adjusted between minimum and maximum demulsifier concentrations, which can be determined through empirical models as a function of temperature. If a current separation is above or below the minimum target separation efficiency, then the demulsifier dosage can be adjusted up to or down to the max/min limits respectively using a standard proportional integral derivative (PID) controller. In case of an upset in the dehydrator, another PID controller with more aggressive tuning can override the required demulsifier concentration to be higher to mitigate the upset. The efficiency calculations can be based on reconciled values to account for instrument measurement errors and closure of the water balance.

Primary objectives of the SDC scheme can include controlling the separation of the water from the HPPTs, at a desired HPPT separation efficiency, to maintain a steady water load to the desalting train by manipulating the demulsifier concentration. This is an improvement over systems, for example, that only control salt-in-crude or the fluid density profile of the oil. The SDC scheme can utilize calculation blocks for on-line monitoring of separation parameters and PID blocks for controlling them, using built-in distributed control system (DCS) functionality. The SDC can be based on basic flow and temperature measurements, so as not to require analyzers such as water-cut meters. Additional blocks can be added to control bottoms sediment & water (BS&W), salt-in-crude if reliable analyzers and vessel density profilers are installed. Demulsifier concentration limits (as function of crude temperature) derived from process data can be incorporated in the logic.

Initiatives for improving crude quality can include, for example, new techniques for the control of demulsifier injection. For example, the SDC can include techniques such as a feedback mechanism for maintaining a separation efficiency in a HPPT, including a proper operating window in which demulsifier concentration is manipulated and controlled. The SDC can include several calculations and PID functional blocks that are described in this document. A detailed process analysis of the separation performance can be used to establish a basis of strategies of the SDC.

Although an SDC scheme is applicable as a concept across different generic gas-oil separation plants (GOSPs), calculations that are used to measure online separation and reasonable limits for demulsifier consumption have to be developed on a case-by-case basis, as there can be several factors that impact separation. Factors related to feed can include, for example, a crude type, a water cut, an emulsion separation index, and a pipe velocity, for example, indicating a presence of slugs. Factors related to design can include, for example, factors associated with HPPT design (including retention time and internals) and demulsifier mixing devices. Factors related to chemicals can include, for example, a demulsifier efficiency to enhance separation, which can be affected by a formula used and a process effect. Factors related to temperature, for example, can include a separation efficiency, typically increasing with temperature.

In some implementations, a typical GOSP can include equipment identified in Table 1:

TABLE 1

Typical GOSP Equipment
GOSP Equipment

| Equipment | Description |
|---|---|
| HPPT | The HPPT separates gas at high pressure (150-450 psig) from the crude oil. It can operate as a three-phase separator to separate free water also. |
| Demulsifier Injection Skid | This demulsifier injection skid injects demulsifier chemical at the production header. Demulsifier breaks emulsions to allow for separation of free water in the high-pressure production trap and assist in crude desalting. |
| LPPT | The low pressure production trap (LPPT) separates gas at low pressure (50 psig) from the crude oil. |
| Charge Pumps | The charge pumps pressure the crude oil from the LPPT to discharge into the crude oil desalting train. |
| Dehydrator | The dehydrator, which receives crude from the charge pumps, is the first stage electrostatic coalescer of the desalting train to remove the bulk emulsions from the crude oil under an electrostatic field. |
| Mixing Valve Station | The mixing valve station shears injection wash water to mix with residual produced water. This will bring the average salinity of the water in the oil. |
| Desalter | The desalter is the second-stage electrostatic coalescer of the desalting train. It removes the remaining produced water along with injected wash water to produce dry and desalted crude (at 0.2% BS&W and 10 PTB) |
| WOSEP | The water-oil separator (WOSEP) de-oils the produced water from the HPPT, dehydrator and desalter to less than 100 milligrams per liter |
| Disposal Water Injection Pumps | The disposal water injection pumps discharge water into disposal wells for maintaining reservoir pressure |

The following terms apply to this disclosure. A "demulsifier concentration" is a measurement of concentration, typically in parts per million (ppm), of demulsifier chemical in the total fluid, such as a fluid including oil and water. An "HPPT separation efficiency" is a percentage of water separated in the HPPT versus the total water removed at the GOSP. An "HPPT retention time" is a time, in minutes, for water to separate from crude in an HPPT separation compartment, such as an upstream water weir.

GOSP configurations can serve as a basis for understanding the SDC. For example, to achieve goals of the SDC scheme, it is important to consider the GOSP configuration. This is because the GOSP configuration would be used to determine the best possible control scheme, including the number of production manifolds, HPPTs, line-up options between manifolds and HPPTs, and mode of operation of each HPPT, such as whether the mode is three-phase or 2-phase. A demulsifier is normally added upstream of the HPPT through an automatic flow control.

FIG. 1 is a schematic of an example generic wet crude handling configuration 100, according to an implementation. As illustrated in FIG. 1, using the SDC, free water can be knocked-out at an HPPT 102, and remaining water can be separated in a dehydrator 104 before a wash water injection upstream desalter 106. The SDC can be based on the online separation measured at HPPT 102. A target of the process is to avoid big changes in water inlet to the dehydrator, so operation can be smooth to minimize disturbances in the interface profile.

To determine a proper HPPT separation value, for example, a water mass balance can be performed around a water oil separator (WOSEP) 110 to ensure that calibration errors are corrected so as not to affect the control. Validation software can be used for data reconciliation to ensure that the water mass balance is closed and accurate separation efficiencies can be determined.

As illustrated in FIG. 1, HPPTs 102 and 108 feed into a low-pressure production trap (LPPT) 114, which feeds charge pumps 118. Desalter 106 and other elements 117 also feed the WOSEP 110, as wash water from the desalter 106 can discharge to the WOSEP 110 directly. The desalter 106 is fed by the output of wash water pumps 122 that are fed by a degassing vessel 124. The WOSEP 110 feeds salt water injection wells 126, which provide output to water injection wells 128. Output of desalter 106 feeds shipper pumps 130 which provides output to dry crude product pipeline 131.

Figure 2:
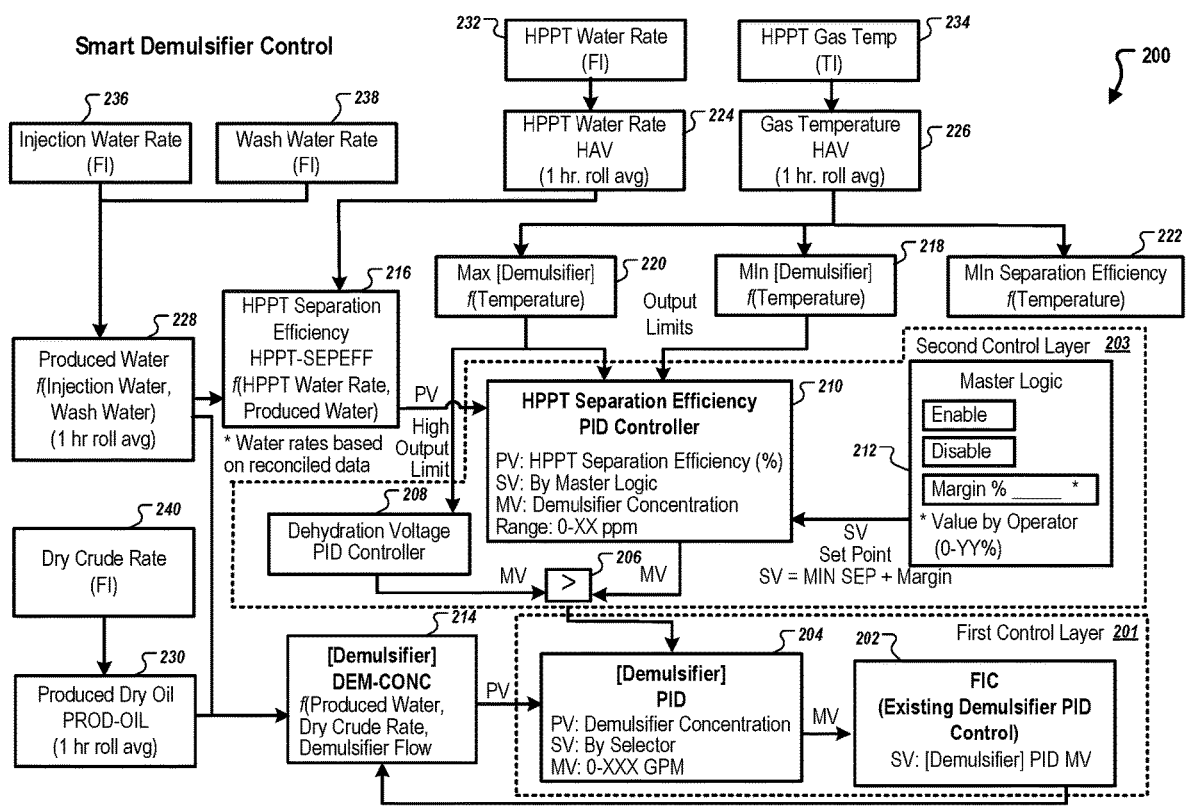
FIG. 2 is a block diagram illustrating an example smart demulsifier control architecture, according to an implementation.

FIG. 2 is a block diagram illustrating an example smart demulsifier control architecture 200, according to an implementation. As illustrated in FIG. 2, the SDC architecture 200 includes a first control layer 201 that ensures that demulsifier concentration can be maintained regardless of crude and/or water flow oscillations. In some implementations, variables used in the first control layer 201 can include the following. A controlled variable can be used as a demulsifier concentration, measured in parts per million over the total liquid flow. A manipulated variable can be used as a demulsifier flow set point. Disturbances variables can include a dry crude flow oscillation, a produced water flow oscillation, and a demulsifier flow oscillation.

Components in the SDC architecture 200 include the following annotations. A flow indication (FI) can indicate, for example, a flow reading from flow transmitter. A temperature indication (TI) can indicate, for example, a temperature reading from temperature transmitter. A process value (PV) can indicate, for example, a value of a process variable that is being controlled. A manipulated value (MV) can indicate, for example, a controller output that triggers action of a final control element to a control process variable. A set value (SV) can indicate, for example, a desired set point of the process variable that is being controlled. The SDC architecture 200 also identifies one or more instances of a flow indication controller, a PID control, an hourly average (HAV), and a GOSP.

A second control layer 203 can include master logic that once enabled, simultaneously sets the target demulsifier concentration for a required HPPT separation efficiency and monitors dehydrator voltage. The second control layer 203 can serve as the master of the first control layer 201. In some implementations, variables used in the second control layer 203 can include the following. Controlled variables can include an HPPT separation efficiency (%) and a dehydrator voltage drops, for example, measured in volts. A manipulated variable can include a demulsifier concentration, measured in ppm. Disturbance variables can include temperature, which can be measured, and feed variability, which is not measured. The SDC architecture 200 can include design features that provide the capability to use the first control layer 201, such as in concentration control, or both layers, such as in a full control scheme.

Components of the SDC architecture 200 can use the following PID blocks and controllers. A demulsifier concentration controller, for example, can adjust the demulsifier flow based on the total GOSP liquid flow, including dry crude and produced water. Moving average filters can be applied to flow measurements prior to taking the ratio to minimize the impact of noise on the control.

In the first control layer 201, a flow indication controller (FIC) 202 can serve as a demulsifier flow controller that provides a demulsifier flow control loop. The flow can be automatically adjusted based on a flow set point of a demulsifier concentration PID block 204. Output of the demulsifier concentration PID block 204 is the set point of the flow indication controller (FIC) 202.

The demulsifier concentration PID controller 204 is based on the demulsifier concentration set point and determines the required demulsifier dosage (in gallons per day (GPD)) to maintain a concentration set point based on the GOSP oil and water production rates. The required demulsifier rate is the set point of the standard demulsifier flow control loop.

A high selector 206 can select the highest value (maximum) of two controllers: an HPPT separation efficiency PID controller 210 and a dehydrator voltage PID controller 208. The highest value can be selected to determine the set point of the demulsifier concentration PID controller 204.

In the case that low common voltage is experienced in the dehydrator, such as with voltage drops below a voltage set point, the dehydrator voltage PID controller 208 can increase the demulsifier concentration set point up to a maximum allowable concentration at that temperature, such as determined from correlations of past concentration data.

The HPPT separation efficiency PID controller 210 can control the separation of water from oil in an HPPT, such as with an "HPPT Separation Efficiency (%)." The output of the HPPT separation efficiency PID controller 210 can be used in a high value calculation for the set point of the demulsifier concentration PID controller 204. The demulsifier concentration can be increased if the separation efficiency is lower than the set point. It can be decreased if separation efficiency is greater than the set point. Demulsifier concentration limits, including maximum and minimum, can be determined based on site-specific process correlations.

A master logic block 212 can be the only block (or one of a few blocks) in which operator intervention is required. Access to the full functionality of the master logic block 212 can be enabled for operators who have full permissions. The master logic block 212 can automatically provide the set point for the HPPT separation efficiency PID controller 210 based on an observed temperature and a margin that the operator can enter, such as up to a certain percentage greater than a minimum separation efficiency. The operator can also disable the controller using the master logic block 212.

The following are at least some of the calculations performed in the SDC. Each calculation can include a number of parameters that can be adjusted if required.

A demulsifier concentration 214 at the HPPT can be based on total fluid, with a demulsifier flow being an instantaneous demulsifier flow in GPD, given by Equation (1):

$$\text{Demulsifier Concentration (ppm)} = \frac{\text{Demulsifier flow }(GPD)}{[(\text{Produced Oil Flow} + \text{Produced Water Flow})](MBD)} \cdot 25. \quad (1)$$

An HPPT separation efficiency 216 can be based on per HPPT water outlet flowmeter, given by Equation (2):

$$HPPT\text{ Separation Efficiency (\%)} = \frac{\text{1-Hr Rolling Average } HPPT \text{ Water }(MBD) + REC_{HPPT}}{[(\text{1-Hr Rolling Average Produced Water} + REC_{PROD-WTR})](MBD)} \cdot 100, \quad (2)$$

where $REC_{HPPT}$ is a reconciliation parameter coefficient for HPPT water outlet flow, and $REC_{PROD-WTR}$ is a reconciliation parameter coefficient for produced water flow.

A minimum demulsifier concentration 218 is a minimum allowed demulsifier concentration as a function of the temperature. The concentration can provide the dynamic low output limit for PID control of HPPT separation efficiency, as given by Equation (3). P01, P02, P03, and P04 are coefficients in the equations below that can be developed based on curve fitting or linear regression. Each equation can have a different coefficient, so P01 in Equation (3) can be different than P01 in Equation (5).

$$\text{MIN DEM CONC (ppm)} = P01 \cdot (\text{1-Hr Rolling Avg Crude Temperature}) + P02 \quad (3)$$

Despite the parameter values, a hard minimum limit can also be applied. It is important to consider that maximum limit always has to be above minimum limit.

A maximum demulsifier concentration 220 is a maximum allowed demulsifier concentration as a function of the temperature. The concentration provides the dynamic high output limit for PID controllers of HPPT separation efficiency and for the dehydrator voltage override, as given by Equation (4):

$$\text{MAX DEM CONC (ppm)} = P03 \cdot (\text{1-Hr Rolling Avg Crude Temperature}) + P04 \quad (4)$$

Despite the parameters values, a maximum (hard) limit can be defined for this calculation. It is important to consider that a maximum limit always has to be above minimum limit.

A minimum HPPT separation efficiency 222 is a minimum separation expected at HPPT as a function of the temperature, as given by Equation (5):

$$\text{MIN HPPT SEP (\%)} = P01 \cdot (\text{1-Hr Rolling Avg Crude Temperature})^2 + P02 \cdot (\text{1-Hr Rolling Avg Crude Temperature}) + P03 \quad (5)$$

Minimum separation efficiency here is expressed as a second-degree polynomial. However, minimum separation efficiency can be expressed in other forms depending on how the process data is curve-fitted, such as in a linear equation, exponential, power, or in other ways.

Rolling average process variables can represent one-hour rolling averages of the process variable that is measured. A one-hour rolling average HPPT water rate 224 is a rolling average of the water flow rate indication from the HPPT. A one-hour rolling average crude temperature 226 is a rolling average of the gas temperature indication from the HPPT, and can be assumed to be the same temperature of the crude oil. A one-hour rolling average produced water 228 is the rolling average of the calculation of the GOSP produced water rate, such as the total water rate minus the wash water rate. A one-hour rolling average produced dry oil 230 is the rolling average of the dry oil rate produced from the GOSP. Other one-hour rolling average process variables are possible.

The following process values and variables can be used as inputs of the control scheme. An HPPT water rate 232 can measure a flowrate of water from the HPPT. An HPPT gas temperature 234 can indicated a temperature of gas from the HPPT, representing the temperature of the crude oil. An injection water rate 236 can indicate a total water rate from the GOSP which is being injected back into the reservoir. A wash water rate 238 can indicate a fresh water rate used for a crude desalting process. A dry crude rate 240 can indicate a total produced oil rate from the GOSP. Other process values and variables are possible.

An HPPT separation efficiency controller can serve as the master controller that determines the amount of demulsifier required, such as a concentration target, based on the real performance of the HPPT that is measured online. The HPPT separation efficiency controller can send its output to the demulsifier concentration controller, such as using a high-value selector. The HPPT separation efficiency controller can include some special features to accomplish its control function, including the following settings. First, a process value (PV) can be determined from a calculation which is filtered, such as using a one-minute scan, to avoid extra noise. Second, an HPPT separation set point required can be dynamic based on the temperature. For example, for a given GOSP and feed, the temperature can be the major disturbance that affects HPPT separation efficiency. It may not be practical, nor achievable with reasonable demulsifier consumptions, to entirely compensate for the temperature effect by manipulating demulsifier. Therefore, different set points can be provided as a function of the temperature. The separator can be required to achieve a certain margin over the minimum proven efficiency of the separator, according to historical data in a steady state. Third, dynamic limits of the output, including maximum and minimum limits, can be provided as a function of the temperature. The dynamic limits can be a key feature to ensure a proper utilization of demulsifier. Equations to calculate these dynamic limits can be based on historical steady-state and plant-specific process data analysis. Fourth, the HPPT separation efficiency controller can be tuned as a steady state controller, allowing for the provision of low gain and integral times. Fifth, non-linear (gap) gain reduction can be provided to reduce any remaining noise effect on demulsifier adjustments.

In some implementations, other functional blocks can be added to override the HPPT separation efficiency controller. For example, an additional functional block can be added that controls a dehydrator emulsion layer profile, and other functional blocks can be added that perform other functions.

FIGS. 3A-3E collectively illustrate a block diagram 300 of an example integration of a control scheme and various processes, according to an implementation. Oil flows go through HPPT 302, an LPPT 304, dehydrator 306a, and desalter 306b to product pipeline. Water flows from HPPT 302, dehydrator 306a and desalter 306b flows to WOSEP 308. Water from WOSEP 308 is injected with disposal water injection pumps 320 into a reservoir. Controller inputs 310b-310n provide inputs into the process. The process also uses a local switch board 312, crude charge pump stations 314, a wash water mixing valve station 316, a local switch board 318, and disposal water injection pumps 320. Other components are possible.

Figure 3A:
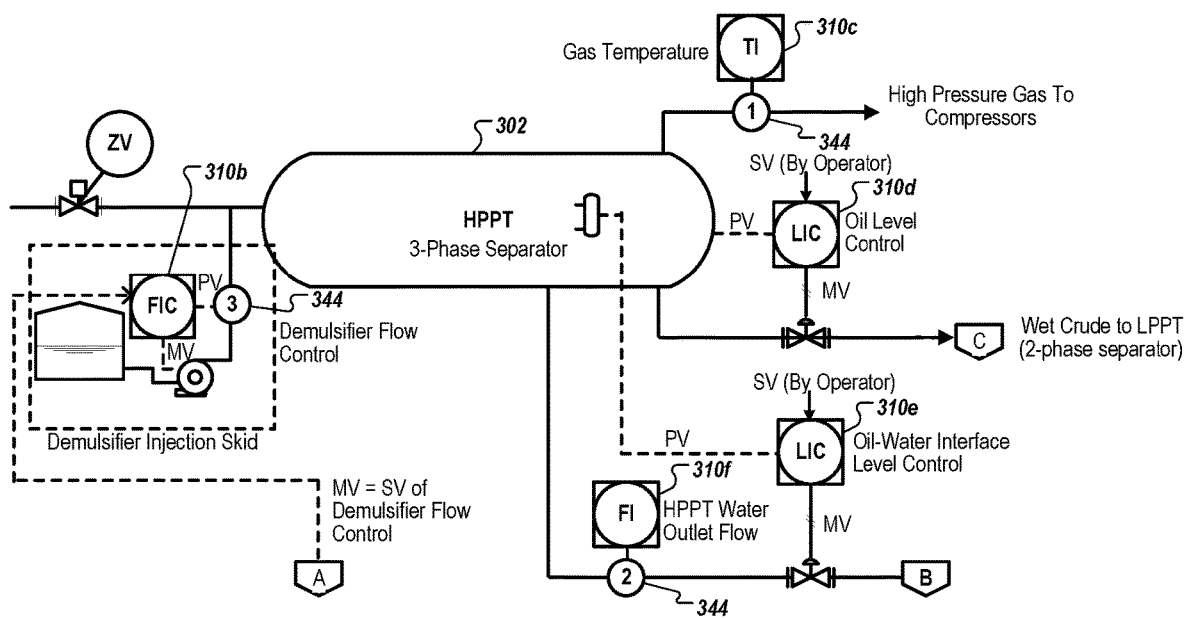
FIGS. 3A-3E collectively illustrate a block diagram of an example integration of a control scheme and various processes, according to an implementation.
Figure 3B:
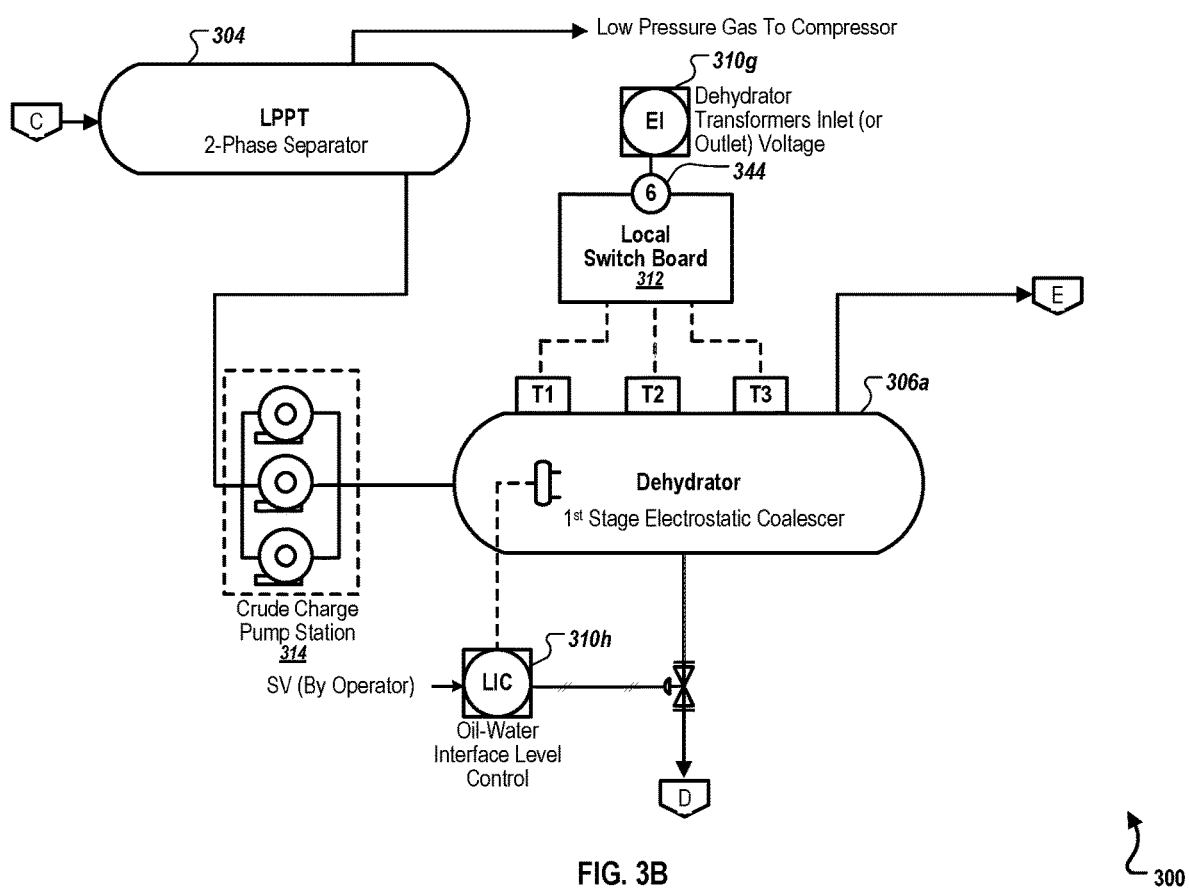
Figure 3C:
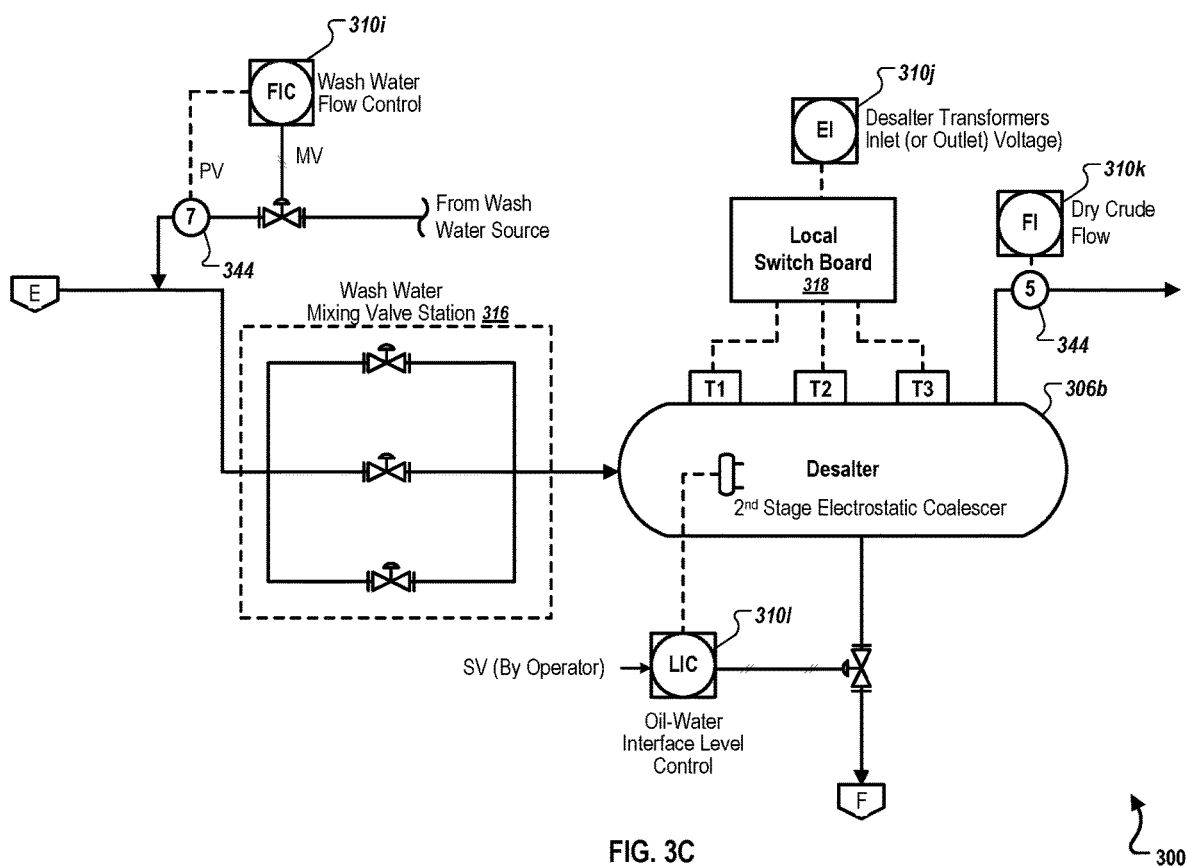
Figure 3D:
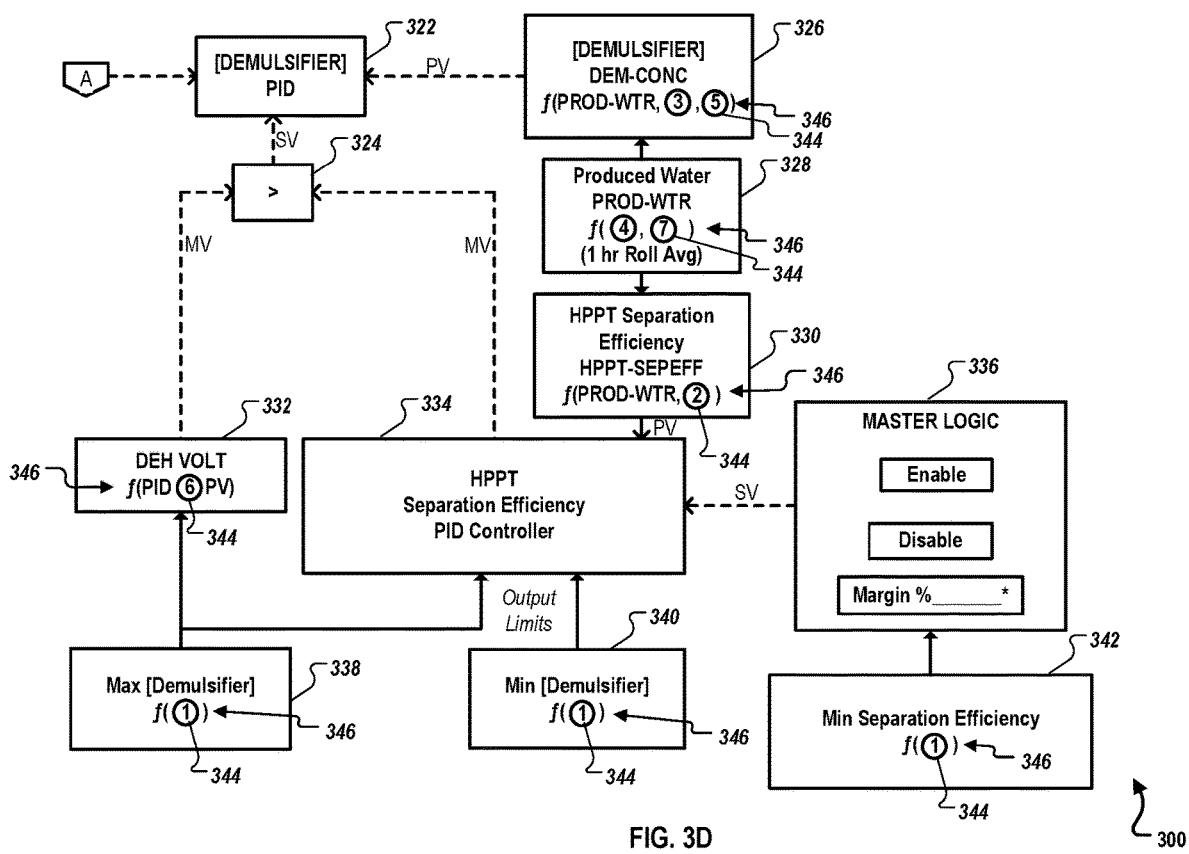
Figure 3E:
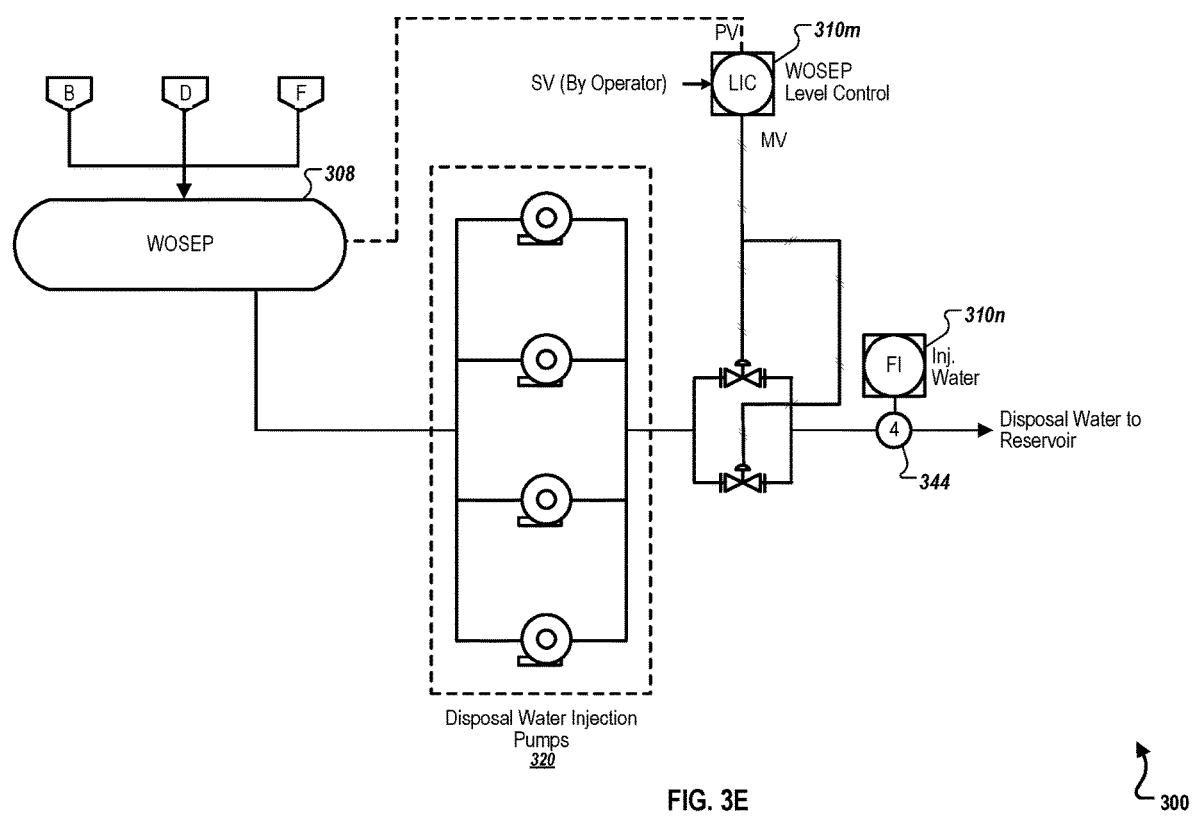

Referring to FIG. 3D, logic components 322-342 control demulsifier amounts, as previously described, with reference to FIG. 2 for similar components. Functions 346 used in some of the logic components 322-342 identify numbered inputs 344 that are illustrated at various points in FIGS. 3A-3E. In FIG. 3D, measured process variables are used in the functions 346 are one hour rolling averages.

FIG. 4 is a flowchart illustrating an example method 400 for controlling HPPT separation efficiency, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402, a feedback control scheme is implemented that includes controlling a separation efficiency for a high-pressure production trap (HPPT) by manipulating the demulsifier concentration. For example, the feedback control scheme controlled by the method 400 can be implemented by elements of the smart demulsifier control architecture 200. In some implementations, the feedback control scheme that is implemented includes sub-steps 404-408. From 402, method 400 proceeds to 404.

At 404, a minimum target separation efficiency and a maximum target separation efficiency are each determined as a function of temperature and based on correlations of historical process data. For example, as given by Equation (5), the minimum HPPT separation efficiency 222 can be calculated as a function of the temperature, and the high selector 206 can select the highest value (maximum), also based on temperature. From 404, method 400 proceeds to 406.

At 406, a target separation efficiency is identified that is between the minimum target separation efficiency and the maximum target separation efficiency. As an example, the HPPT separation efficiency PID controller 210 can determine the target separation efficiency using the minimum and maximum target separation efficiencies. In some implementations, identifying the target separation efficiency includes receiving, from an operator, input specifying an increase to an expected separation performance by a certain margin. For example, the master logic block 212 can automatically provide the set point for the HPPT separation efficiency PID controller 210 based on an observed temperature and a margin entered by an operator, such as up to a certain percentage greater than a minimum separation efficiency. From 406, method 400 proceeds to 408.

At 408, a demulsifier dosage that is used in calculating the separation efficiency is adjusted between a minimum demulsifier concentration and a maximum demulsifier concentration. For example, the demulsifier concentration PID controller 204 can set the demulsifier dosage based at least on the target separation efficiency. The adjusting can include steps 410-414. From 408, method 400 proceeds to 410.

At 410, a determination is made as to whether the separation efficiency is below or above the target separation efficiency. At 412, if it is determined that the separation efficiency is below the target separation efficiency, then the demulsifier dosage is adjusted upward (using a PID controller) but not to exceed a maximum dosage concentration. Otherwise, at 414, if it is determined that the separation efficiency is above the target separation efficiency, then the demulsifier dosage is adjusted downward (using the PID controller) above a minimum dosage concentration. The flow indication controller 202, for example, can adjust the demulsifier dosage downward or upward based on the determination at 410. From 412 and 414, method 400 stops.

In some implementations, the method 400 also includes determining that an upset has occurred in a dehydrator and using another PID controller having more aggressive tuning than a current PID controller to override demulsifier concentration to mitigate the upset. For example, the efficiency calculations can be based on reconciled values to account for instrument measurement errors and closure of the water balance.

Figure 5:
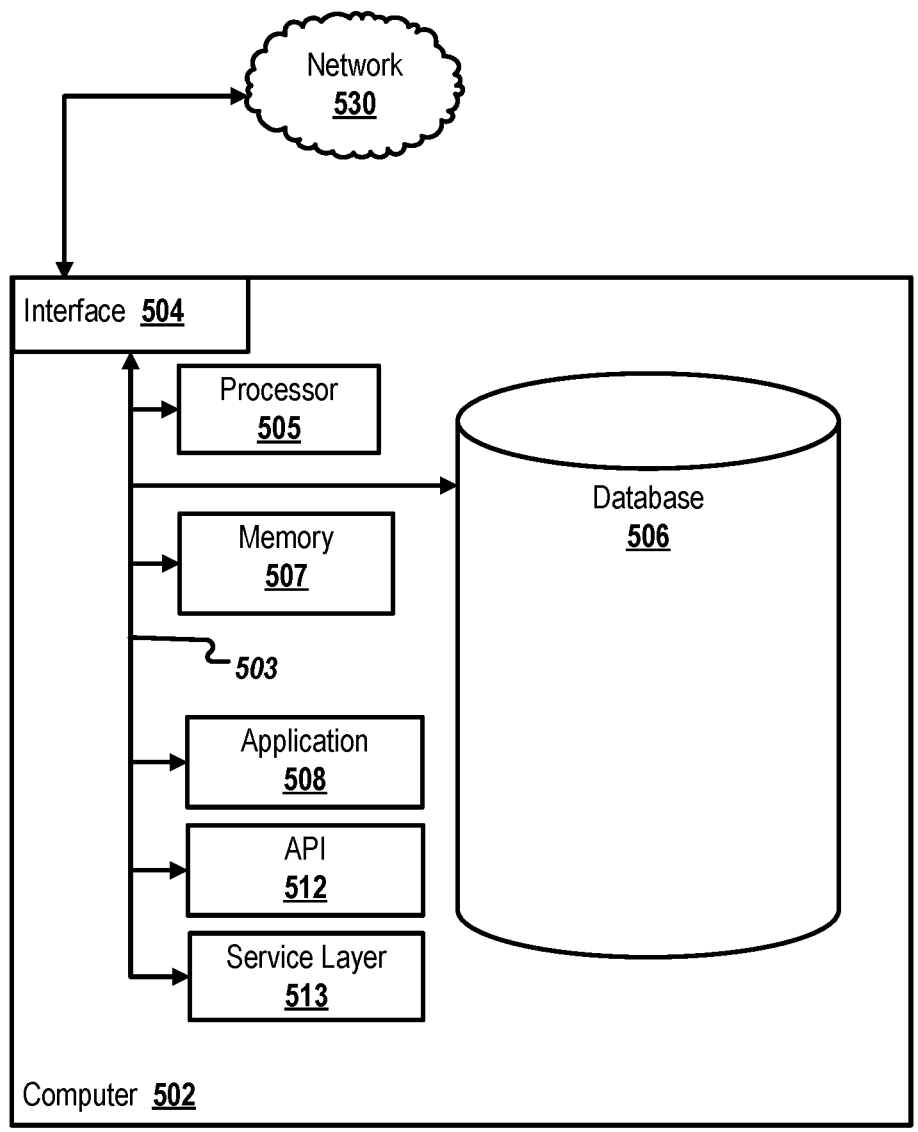
FIG. 5 is a block diagram illustrating an exemplary computer system used to provide computational functionalities associated with described algorithms, methods, functions, processes, flows, and procedures as described in the instant disclosure, according to an implementation.

FIG. 5 is a block diagram of an example computer system 500 used to provide computational functionalities associated with described algorithms, methods, functions, processes, flows, and procedures, as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530 (for example, any computer network described with respect to the instant subject matter). In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer 502) and respond to the received requests by processing the received requests using an appropriate software application(s). In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, hardware or software (or a combination of both hardware and software), may interface with each other or the interface 504 (or a combination of both), over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems that are connected to the network 530 (whether illustrated or not) in a distributed environment. Generally, the interface 504 comprises logic encoded in software or hardware (or a combination of software and hardware) and is operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like, storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, or applications. Further, although illustrated as a single application 508, the application 508 may be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or other power management functionality). In some implementations, the power-supply 514 can include a power plug to allow the computer 502 to be plugged into a wall socket or other power source to, for example, power the computer 502 or recharge a rechargeable battery.

There may be any number of computers 502 associated with, or external to, a computer system containing computer 502, each computer 502 communicating over network 530. Further, the term "client," "user," and other appropriate terminology may be used interchangeably, as appropriate, without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, computer-implemented method can control demulsifier dosage. The method includes implementing a feedback control scheme including controlling a separation efficiency for a high-pressure production trap (HPPT) by manipulating the demulsifier concentration. Implementing the feedback control scheme includes: determining, as a function of temperature and based on correlations of historical process data, a minimum target separation efficiency and a maximum target separation efficiency; identifying a target separation efficiency that is between the minimum target separation efficiency and the maximum target separation efficiency; and adjusting a demulsifier dosage, used in calculating the separation efficiency, between a minimum demulsifier concentration and a maximum demulsifier concentration. The adjusting includes: when the separation efficiency is below the target separation efficiency, adjusting, using a PID controller, the demulsifier dosage upward but not to exceed a maximum dosage concentration; and when the separation efficiency is above the target separation efficiency, adjusting, using the PID controller, the demulsifier dosage downward above a minimum dosage concentration.

The foregoing and other described implementations can each, optionally, include one or more of the following features:

A first feature, combinable with any of the following features, identifying the target separation efficiency includes receiving, from an operator, input specifying an increase to an expected separation performance by a certain margin.

A second feature, combinable with any of the previous or following features, the minimum demulsifier concentration and the maximum demulsifier concentration are determined through correlations and are a function of temperature.

A third feature, combinable with any of the previous or following features, the method further includes determining that an upset has occurred in a dehydrator and using another PID controller having more aggressive tuning than a current PID controller to override demulsifier concentration to mitigate the upset.

A fourth feature, combinable with any of the previous or following features, the method further includes determining efficiency calculations that are based on reconciled values to account for instrument measurement errors and closure of the water balance.

A fifth feature, combinable with any of the previous or following features, adjusting the demulsifier dosage includes maintaining the demulsifier dosage regardless of crude and water flow oscillations.

A sixth feature, combinable with any of the previous or following features maintaining the demulsifier dosage includes using a controlled variable used as a demulsifier concentration, a manipulated variable used as a demulsifier flow set point, and disturbances variables including a dry crude flow oscillation, a produced water flow oscillation, and a demulsifier flow oscillation.

In a second implementation, non-transitory, computer-readable medium storing one or more instructions executable by a computer system to perform operations for controlling demulsifier dosage. The operations include implementing a feedback control scheme including controlling a separation efficiency for a high-pressure production trap (HPPT) by manipulating the demulsifier concentration. Implementing the feedback control scheme includes: determining, as a function of temperature and based on correlations of historical process data, a minimum target separation efficiency and a maximum target separation efficiency; identifying a target separation efficiency that is between the minimum target separation efficiency and the maximum target separation efficiency; and adjusting a demulsifier dosage, used in calculating the separation efficiency, between a minimum demulsifier concentration and a maximum demulsifier concentration. The adjusting includes: when the separation efficiency is below the target separation efficiency, adjusting, using a PID controller, the demulsifier dosage upward but not to exceed a maximum dosage concentration; and when the separation efficiency is above the target separation efficiency, adjusting, using the PID controller, the demulsifier dosage downward above a minimum dosage concentration.

The foregoing and other described implementations can each, optionally, include one or more of the following features:

A first feature, combinable with any of the following features, identifying the target separation efficiency includes receiving, from an operator, input specifying an increase to an expected separation performance by a certain margin.

A second feature, combinable with any of the previous or following features, the minimum demulsifier concentration and the maximum demulsifier concentration are determined through correlations and are a function of temperature.

A third feature, combinable with any of the previous or following features, the operations further include determining that an upset has occurred in a dehydrator and using another PID controller having more aggressive tuning than a current PID controller to override demulsifier concentration to mitigate the upset.

A fourth feature, combinable with any of the previous or following features, the operations further include determining efficiency calculations that are based on reconciled values to account for instrument measurement errors and closure of the water balance.

A fifth feature, combinable with any of the previous or following features, adjusting the demulsifier dosage includes maintaining the demulsifier dosage regardless of crude and water flow oscillations.

A sixth feature, combinable with any of the previous or following features maintaining the demulsifier dosage includes using a controlled variable used as a demulsifier concentration, a manipulated variable used as a demulsifier flow set point, and disturbances.

In a third implementation, a computer-implemented system comprises a computer memory and a hardware processor interoperably coupled with the computer memory and configured to perform operations for controlling demulsifier dosage. The operations include implementing a feedback control scheme including controlling a separation efficiency for a high-pressure production trap (HPPT) by manipulating the demulsifier concentration. Implementing the feedback control scheme includes: determining, as a function of temperature and based on correlations of historical process data, a minimum target separation efficiency and a maximum target separation efficiency; identifying a target separation efficiency that is between the minimum target separation efficiency and the maximum target separation efficiency; and adjusting a demulsifier dosage, used in calculating the separation efficiency, between a minimum demulsifier concentration and a maximum demulsifier concentration. The adjusting includes: when the separation efficiency is below the target separation efficiency, adjusting, using a PID controller, the demulsifier dosage upward but not to exceed a maximum dosage concentration; and when the separation efficiency is above the target separation efficiency, adjusting, using the PID controller, the demulsifier dosage downward above a minimum dosage concentration.

The foregoing and other described implementations can each, optionally, include one or more of the following features:

A first feature, combinable with any of the following features, identifying the target separation efficiency includes receiving, from an operator, input specifying an increase to an expected separation performance by a certain margin.

A second feature, combinable with any of the previous or following features, the minimum demulsifier concentration and the maximum demulsifier concentration are determined through correlations and are a function of temperature.

A third feature, combinable with any of the previous or following features, the operations further include determining that an upset has occurred in a dehydrator and using another PID controller having more aggressive tuning than a current PID controller to override demulsifier concentration to mitigate the upset.

A fourth feature, combinable with any of the previous or following features, the operations further include determining efficiency calculations that are based on reconciled values to account for instrument measurement errors and closure of the water balance.

A fifth feature, combinable with any of the previous or following features, adjusting the demulsifier dosage includes maintaining the demulsifier dosage regardless of crude and water flow oscillations.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are illustrated as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order illustrated or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   implementing a feedback control scheme including controlling a separation efficiency for a high-pressure production trap (HPPT) by manipulating a demulsifier concentration, including:
      determining, as a function of temperature and based on correlations of historical process data, a minimum target separation efficiency and a maximum target separation efficiency;
      identifying a target separation efficiency that is between the minimum target separation efficiency and the maximum target separation efficiency; and
      adjusting a demulsifier dosage, used in calculating the separation efficiency, between a minimum demulsifier concentration and a maximum demulsifier concentration, the adjusting including:
         when the separation efficiency is below the target separation efficiency, adjusting, using a PID controller, the demulsifier dosage upward but not to exceed a maximum dosage concentration; and
         when the separation efficiency is above the target separation efficiency, adjusting, using the PID controller, the demulsifier dosage downward above a minimum dosage concentration.

2. The computer-implemented method of claim 1, wherein identifying the target separation efficiency includes receiving, from an operator, input specifying an increase to an expected separation performance by a certain margin.

3. The computer-implemented method of claim 1, wherein the minimum demulsifier concentration and the maximum demulsifier concentration are determined through correlations and are a function of temperature.

4. The computer-implemented method of claim 1, further comprising:
   determining that an upset has occurred in a dehydrator; and
   using another PID controller having more aggressive tuning than a current PID controller to override the demulsifier concentration to mitigate the upset.

5. The computer-implemented method of claim 1, further comprising: determining efficiency calculations that are based on reconciled values to account for instrument measurement errors and closure of a water balance.

6. The computer-implemented method of claim 1, wherein adjusting the demulsifier dosage includes maintaining the demulsifier dosage regardless of crude and water flow oscillations.

7. The computer-implemented method of claim 6, wherein maintaining the demulsifier dosage includes using a controlled variable used as a demulsifier concentration, a manipulated variable used as a demulsifier flow set point, and disturbances variables including a dry crude flow oscillation, a produced water flow oscillation, and a demulsifier flow oscillation.

8. A non-transitory, computer-readable medium storing one or more instructions executable by a computer system to perform operations comprising:
   implementing a feedback control scheme including controlling a separation efficiency for a high-pressure production trap (HPPT) by manipulating a demulsifier concentration, including:
      determining, as a function of temperature and based on correlations of historical process data, a minimum target separation efficiency and a maximum target separation efficiency;
      identifying a target separation efficiency that is between the minimum target separation efficiency and the maximum target separation efficiency; and
      adjusting a demulsifier dosage, used in calculating the separation efficiency, between a minimum demulsifier concentration and a maximum demulsifier concentration, the adjusting including:
         when the separation efficiency is below the target separation efficiency, adjusting, using a PID controller, the demulsifier dosage upward but not to exceed a maximum dosage concentration; and
         when the separation efficiency is above the target separation efficiency, adjusting, using the PID controller, the demulsifier dosage downward above a minimum dosage concentration.

9. The non-transitory, computer-readable medium of claim 8, wherein identifying the target separation efficiency includes receiving, from an operator, input specifying an increase to an expected separation performance by a certain margin.

10. The non-transitory, computer-readable medium of claim 8, wherein the minimum demulsifier concentration and the maximum demulsifier concentration are determined through correlations and are a function of temperature.

11. The non-transitory, computer-readable medium of claim 8, the operations further comprising:
    determining that an upset has occurred in a dehydrator; and
    using another PID controller having more aggressive tuning than a current PID controller to override the demulsifier concentration to mitigate the upset.

12. The computer-readable medium of claim 8, the operations further comprising: determining efficiency calculations that are based on reconciled values to account for instrument measurement errors and closure of a water balance.

13. The computer-readable medium of claim 8, wherein adjusting the demulsifier dosage includes maintaining the demulsifier dosage regardless of crude and water flow oscillations.

14. The computer-readable medium of claim 13, wherein maintaining the demulsifier dosage includes using a controlled variable used as a demulsifier concentration, a manipulated variable used as a demulsifier flow set point, and disturbances variables including a dry crude flow oscillation, a produced water flow oscillation, and a demulsifier flow oscillation.

15. A computer-implemented system, comprising:
a computer memory; and
a hardware processor interoperably coupled with the computer memory and configured to perform operations comprising:
implementing a feedback control scheme including controlling a separation efficiency for a high-pressure production trap (HPPT) by manipulating a demulsifier concentration, including:
determining, as a function of temperature and based on correlations of historical process data, a minimum target separation efficiency and a maximum target separation efficiency;
identifying a target separation efficiency that is between the minimum target separation efficiency and the maximum target separation efficiency; and
adjusting a demulsifier dosage, used in calculating the separation efficiency, between a minimum demulsifier concentration and a maximum demulsifier concentration, the adjusting including:
when the separation efficiency is below the target separation efficiency, adjusting, using a PID controller, the demulsifier dosage upward but not to exceed a maximum dosage concentration; and
when the separation efficiency is above the target separation efficiency, adjusting, using the PID controller, the demulsifier dosage downward above a minimum dosage concentration.

16. The computer-implemented system of claim 15, wherein identifying the target separation efficiency includes receiving, from an operator, input specifying an increase to an expected separation performance by a certain margin.

17. The computer-implemented system of claim 15, wherein the minimum demulsifier concentration and the maximum demulsifier concentration are determined through correlations and are a function of temperature.

18. The computer-implemented system of claim 15, the operations further comprising:
determining that an upset has occurred in a dehydrator; and
using another PID controller having more aggressive tuning than a current PID controller to override the demulsifier concentration to mitigate the upset.

19. The computer-implemented system of claim 15, the operations further comprising: determining efficiency calculations that are based on reconciled values to account for instrument measurement errors and closure of a water balance.

20. The computer-implemented system of claim 15, wherein adjusting the demulsifier dosage includes maintaining the demulsifier dosage regardless of crude and water flow oscillations.

* * * * *